United States Patent
Prasad et al.

(10) Patent No.: US 11,050,672 B2
(45) Date of Patent: Jun. 29, 2021

(54) NETWORK-ON-CHIP LINK SIZE GENERATION

(71) Applicant: Arm Limited, Cambridge (GB)

(72) Inventors: Honnahuggi Harinath Venkata Naga Ambica Prasad, Bangalore (IN); Anup Gangwar, Austin, TX (US); Nitin Kumar Agarwal, Bangalore (IN); Ravishankar Sreedharan, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/518,259

(22) Filed: Jul. 22, 2019

(65) Prior Publication Data

US 2021/0029045 A1    Jan. 28, 2021

(51) Int. Cl.
  *H04J 1/16*       (2006.01)
  *H04L 12/851*     (2013.01)
  *H04L 12/933*     (2013.01)
  *H04L 12/46*      (2006.01)
  *H04L 12/841*     (2013.01)
  *G06N 20/00*      (2019.01)

(52) U.S. Cl.
  CPC ...... *H04L 47/2441* (2013.01); *H04L 12/4625* (2013.01); *H04L 47/283* (2013.01); *H04L 49/109* (2013.01); *G06N 20/00* (2019.01)

(58) Field of Classification Search
  CPC .................................................. H04L 49/109
  See application file for complete search history.

(56) References Cited

U.S. PATENT DOCUMENTS 6,829,216 B1    12/2004 Nakata
8,601,423 B1 *  12/2013 Philip ............... G06F 30/394
                                              716/122

(Continued)

OTHER PUBLICATIONS

A. P. Subramanian, H. Gupta and S. R. Das, "Minimum Interference Channel Assignment in Multi-Radio Wireless Mesh Networks," 2007 4th Annual IEEE Communications Society Conference on Sensor, Mesh and Ad Hoc Communications and Networks, San Diego, CA, 2007, pp. 481-490, doi: 10.1109/SAHCN.2007.4292860 (Aug. 20, 2007).

Arunesh Mishra, Suman Banerjee, and William Arbaugh, "Weighted coloring based channel assignment for WLANs," ACM SIGMOBILE Mobile Computing and Communications Review, Jul. 2005, https://doi.org/10.1145/1094549.1094554.

(Continued)

*Primary Examiner* — Bo Hui A Zhu
(74) *Attorney, Agent, or Firm* — Leveque Intellectual Property Law, P.C.

(57) ABSTRACT

The present disclosure advantageously provides a system, a computer-readable medium and a method for synthesizing a Network-on-Chip (NoC). A plurality of route feature vectors are determined based on a network configuration for the NoC. The network configuration includes bridge ports, routers, connections and routes. A link size is determined for each router by providing route feature vectors to a supervised learning-based (SLB) model. The SLB model generates a plurality of route label vectors based on the route feature vectors. Each route label vector is associated with a route feature vector, and includes the link size and a route position for each router. A resizer is added between a bridge and a router with different link sizes or between adjacent routers with different link sizes. Pipeline and retiming components are added based on timing. An output specification is then generated for the NoC.

20 Claims, 10 Drawing Sheets

(56) References Cited

U.S. PATENT DOCUMENTS

| | | |
|---|---|---|
| 9,107,126 B2 | 8/2015 | Elsherif et al. |
| 10,397,928 B1 | 8/2019 | Hahn et al. |
| 2005/0069314 A1 | 3/2005 | De Patre et al. |
| 2008/0151821 A1 | 6/2008 | Cho et al. |
| 2009/0097418 A1 | 4/2009 | Castillo et al. |
| 2011/0292886 A1 | 12/2011 | Lee et al. |
| 2012/0269510 A1 | 10/2012 | Hui et al. |
| 2015/0124644 A1 | 5/2015 | Pani |
| 2017/0048715 A1 | 2/2017 | Fan et al. |
| 2018/0014304 A1 | 1/2018 | Khoshnevisan et al. |
| 2019/0205493 A1* | 7/2019 | Garibay ............... G06F 30/394 |
| 2019/0222668 A1 | 7/2019 | Tulino et al. |
| 2019/0245775 A1 | 8/2019 | Chen et al. |
| 2020/0084114 A1 | 3/2020 | Keppler et al. |

OTHER PUBLICATIONS

Burke, E.K., Mareček, J., Parkes, A.J. et al., "A supernodal formulation of vertex colouring with applications in course timetabling," Ann Oper Res 179, 105-130 (Mar. 30, 2010), https://doi.org/10.1007/s10479-010-0716-z.

Li Xiaoyang, Dong Enqing, Qiao Fulong and Cui Bo, "Vertex coloring based distributed link scheduling for wireless sensor networks," 2012 18th Asia-Pacific Conference on Communications (APCC), Jeju Island, Oct. 2012, pp. 754-759, doi: 10.1109/APCC.2012.6388201 (Dec. 24, 2012).

P. Fraigniaud, M. Heinrich and A. Kosowski, "Local Conflict Coloring," 2016 IEEE 57th Annual Symposium on Foundations of Computer Science (FOCS), New Brunswick, NJ, 2016, pp. 625-634, doi: 10.1109/FOCS.2016.73 (Feb. 2, 2017).

* cited by examiner

NETWORK-ON-CHIP LINK SIZE GENERATION

BACKGROUND

The present disclosure relates to a network. More particularly, the present disclosure relates to a Network-on-Chip (NoC).

A NoC is a network-based communication subsystem implemented on an integrated circuit (IC), such as a System-on-Chip (SoC), that enables IC modules to exchange data more effectively than conventional bus or crossbar architectures. More particularly, a NoC is a router-based packet switching network that connects IC modules, such as intellectual property (IP) cores. A NoC includes various components, such as routers, resizers or serializers/deserializers (SerDes's), physical clock domain crossing (PCDC) buffers, pipeline elements, etc. NoC synthesis is a process that lays out and configures NoC components on the IC based on a NoC input specification. Generally, the NoC design must accommodate the data or traffic communicated between IC modules while satisfying various design constraints, such as power, performance and area (PPA), wiring cost, etc., that may conflict with one another.

NoC synthesis includes, inter alia, selecting the link size or the width of the physical link (i.e., connection) between NoC components. Poorly-selected link sizes can significantly impact the NoC's wiring cost, performance, latency, etc. Known methods for selecting NoC link sizes provide generic solutions that fail to account for specific placement, routing, traffic flow styles, etc. that may be desired by the NoC designer.

DETAILED DESCRIPTION

Figure 1:
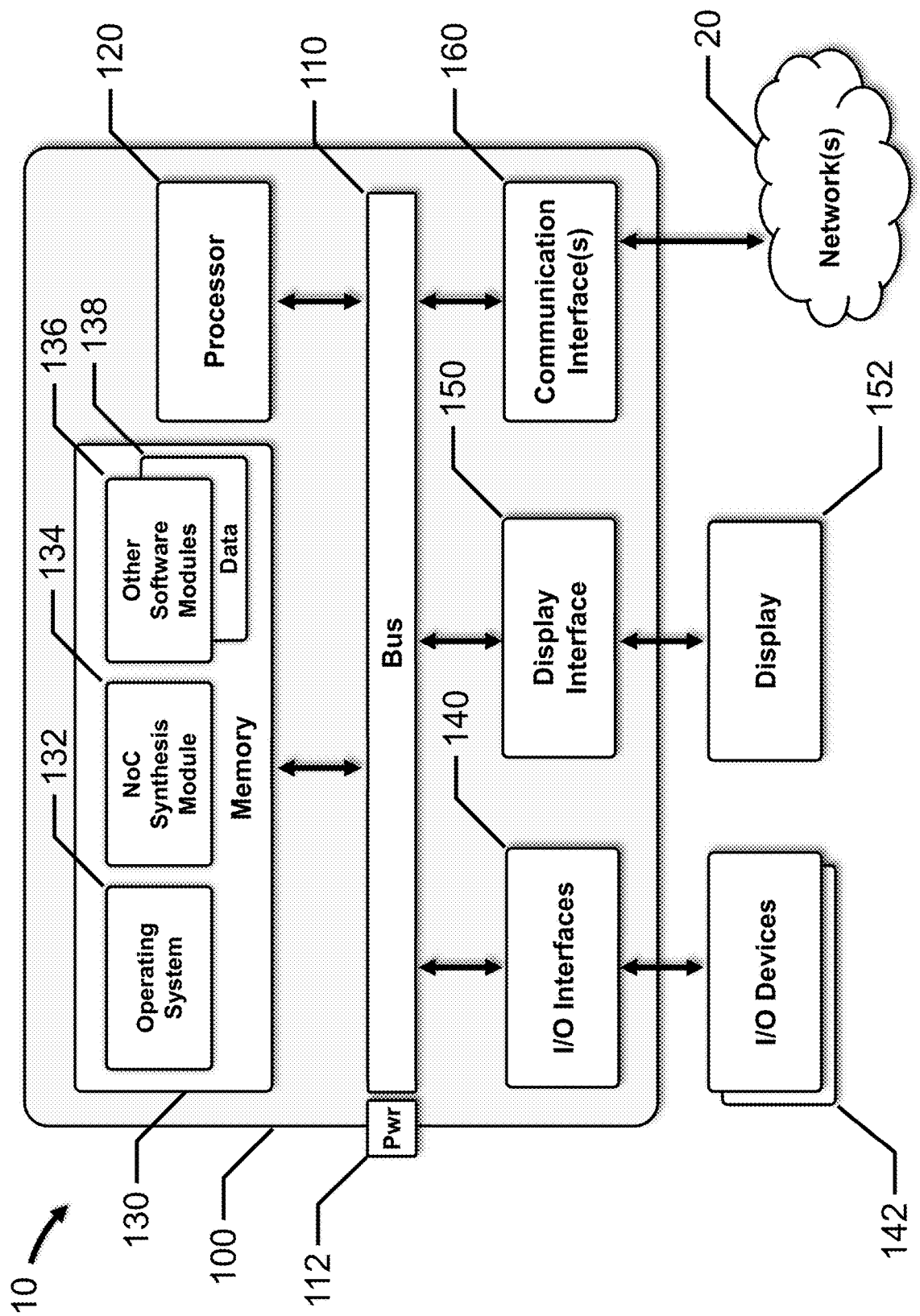
FIG. 1 depicts a block diagram of a NoC synthesis system, in accordance with an embodiment of the present disclosure.

Embodiments of the present disclosure will now be described with reference to the drawing figures, in which like reference numerals refer to like parts throughout.

Embodiments of the present disclosure advantageously provide a system, a non-transitory computer-readable medium and a computer-based method for synthesizing a Network-on-Chip (NoC).

In one embodiment, a plurality of route feature vectors are determined based on a network configuration for a NoC. The network configuration includes a plurality of bridge ports, a plurality of routers, a plurality of connections and a plurality of routes. Each route includes a source bridge port, a destination bridge port and one or more routers disposed along a connection route between the source bridge port and the destination bridge port. Each route feature vector is associated with a route and includes a source bridge port link size, a destination bridge port link size, and a router data set for each router in the route.

A link size is determined for each router, including providing the route feature vectors to a supervised learning-based (SLB) model to generate a plurality of route label vectors. Each route label vector is associated with a route feature vector and includes the link size and a route position for each router. The SLB model is trained based on a plurality of reference route feature vectors and a plurality of associated reference route label vectors.

A resizer is added between a bridge and a router with different link sizes or between adjacent routers with different link sizes.

Pipeline and retiming components are added based on timing.

An output specification is then generated for the NoC.

FIG. 1 depicts a block diagram of NoC synthesis system 10, in accordance with an embodiment of the present disclosure.

Computer 100 includes bus 110, processor 120, memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 20 using a wired or wireless connection.

Bus 110 is a communication system that transfers data between processor 120, memory 130, I/O interfaces 140, display interface 150, and communication interface 160, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, NoC synthesis module 134, other software modules 136, etc., stored within memory 130.

Generally, memory or storage element 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. The software modules also include NoC synthesis module 134 that provides functionality for synthesizing the NoC architecture. In certain embodiments, NoC synthesis module 134 may include a plurality of modules, each module providing specific individual functionality for synthesizing the NoC architecture, such as, for example, an input module, a virtual channel (VC) module, a topology module, a routing module, a network generation module, a PCDC module, a link size and resizer module, an SLB model module, a pipeline and timing component module, an output module, etc. Other software modules 136 may cooperate with NoC synthesis module 134 to provide functionality for synthesizing the NoC architecture.

Data 138 may include data associated with operating system 132, NoC synthesis module 134, other software modules 136, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 20 using one or more wired and/or wireless connections. Network 20 may include one or more local area networks, wide area networks, the Internet, etc., which may execute various network protocols, such as, for example, wired and/or wireless Ethernet, Bluetooth, etc. Network 20 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 2:
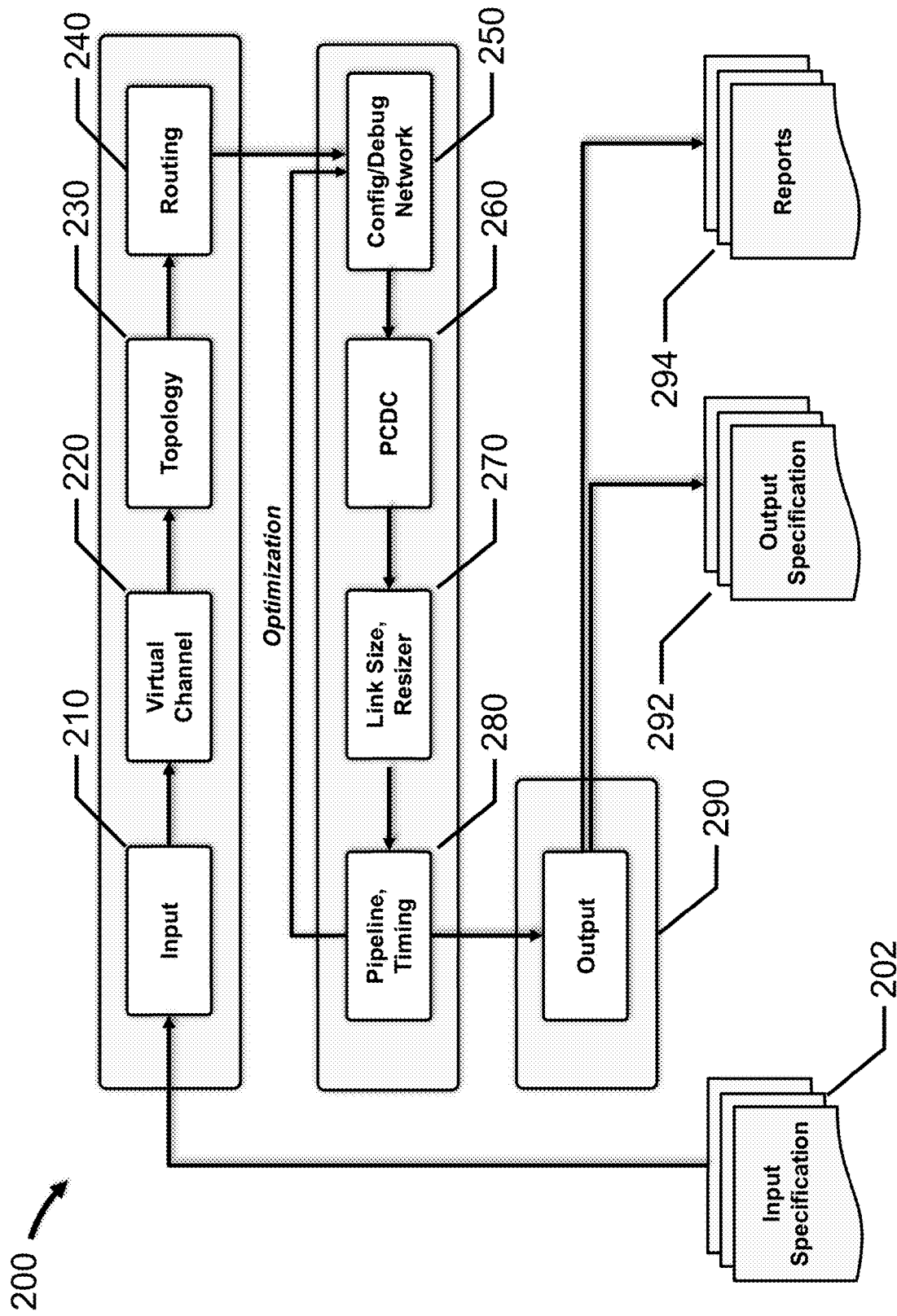
FIG. 2 depicts a NoC synthesis flow diagram, in accordance with an embodiment of the present disclosure.

FIG. 2 depicts NoC synthesis flow diagram 200, in accordance with an embodiment of the present disclosure.

As discussed above, the software modules include NoC synthesis module 134 that provides functionality for synthesizing the NoC architecture. In certain embodiments, NoC synthesis module 134 includes a plurality of modules, each module providing specific individual functionality for synthesizing the NoC architecture, such as, for example, an input module, a VC module, a topology module, a routing module, a network generation module, a PCDC module, a link size and resizer module, a pipeline and timing component module, an output module, etc.

At 210, NoC input specification 202 is retrieved from memory 130 and design information for the NoC is determined. For example, NoC input specification 202 may be received over network 20 and then stored as data 138 in memory 130. In another example, NoC input specification 202 may be created by a NoC designer using one or more software modules 136, and then stored as data 138 in memory 130.

Design information for the NoC includes, for example, physical data, device data, bridge data, traffic data, etc. Additional design information may include voltage domain data, power domain data, clock domain data, address region data, synthesis constraints, etc.

Physical data include the dimensions for the NoC and a list of unrouteable areas. NoC components, such as bridges, routers, pipelines, resizers, connections, etc., are not typically located within unrouteable areas. In one example, the NoC is modeled as an array of cells arranged in rows and columns. The number of rows is defined by a height (in cells), and the number of columns is defined by a width (in cells). A cell width, in millimeters, micrometers, inches, etc., may also be provided. The cells are numbered sequentially, starting in the upper left corner of the array. Data for each unrouteable area include a location (cell number) and dimensions, such as a width (in cells) and a height (in cells). In another example, the NoC is modeled as a grid defined by cartesian coordinates (X, Y), with the origin located in the lower left corner of the grid. The height and the width are provided in normalized units, and a normalization factor may also be provided. Data for each unrouteable area include a location (X, Y) and dimensions, such as a width (X) and a height (Y).

Device data include a list of devices, such as IP cores, IC modules, etc., located within the NoC. Each device includes one or more bridge ports (i.e., signal interfaces). Data for each device may include a name, a location (cell number, X-Y coordinates, etc.), dimensions including a width (in cells, X dimension, etc.) and a height (in cells, Y dimension, etc.), a power domain, etc.

Bridge data include a list of bridge ports for the devices. Data for each bridge port may include a name, an associated device name, a location (cell number, X-Y coordinates, etc.), a data width (in bits), a low/high wire indicator, etc.

In many embodiments, the NoC is a packet-switched network that divides data packets into a sequence of message flow control units or flits. Each flit has the same size (in bits), and is divided into a sequence of data transfers across a physical connection, known as physical units or phits. In one example, the flit size for the NoC is 128 bits. A bridge port having a data width (phit size) of 32 bits needs 4 phits to transfer each flit. In the context of the present disclosure, the link size for this bridge port is 4. Similarly, a bridge port having a data width of 16 bits needs 8 phits to transfer each flit and has a link size of 8, while a bridge port having a data width of 64 bits needs 2 phits to transfer each flit and has a link size of 2. Other flit sizes, such as, for example, 32 bits, 64 bits, 256 bits, 512 bits, etc. may also be used. Different flow control techniques may be used in alternative embodiments.

Traffic data include a list of traffic flows for the NoC. Data for each traffic flow include a source bridge port, a destination bridge port, a peak traffic rate, an average traffic rate, and a traffic class. The source bridge port and the destination bridge port are included within the list of bridge ports. The peak traffic rate and the average traffic rate are provided in bits or bytes per second, such as, for example, b/s, kb/s, Mb/s, Gb/s, Tb/s, etc., B/s, KB/s, MB/s, GB/s, TB/s, etc.

Generally, the traffic class provides one or more metrics that differentiate the level of NoC performance that may be provided for each traffic flow. In many embodiments, the traffic class includes a quality of service (QoS) metric and a latency sensitivity (LS) metric. The QoS metric provides a mechanism to prioritize traffic within the NoC, while the LS metric indicates the sensitivity of the traffic to network delays. For example, for an integer QOS metric with four possible values (e.g., 0 to 3) and a Boolean LS metric with two possible values (e.g., true or false), 8 different traffic classes are provided. In this example, a QoS value of 0 and an LS value of true provides the best potential NoC performance. Other metrics are also contemplated. Additionally, a message type may also be provided, such as, for example, a read request, a write request, a read/write request, etc.

Figure 3:
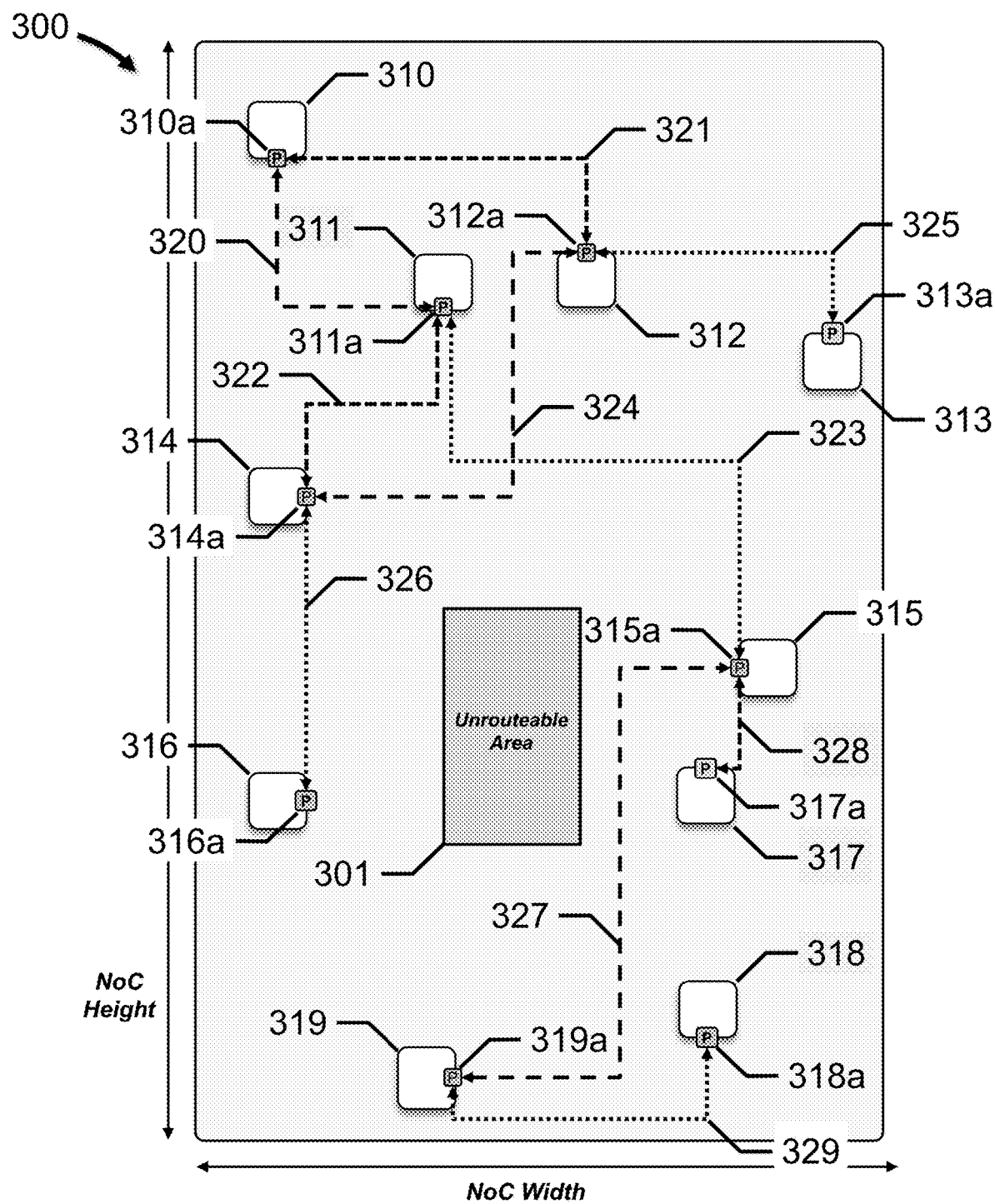
FIG. 3 depicts a graphical representation of an input specification for a NoC, in accordance with an embodiment of the present disclosure.

FIG. 3 depicts a graphical representation of NoC input specification 202, in accordance with an embodiment of the present disclosure. A user may view NoC 300 on display 152.

NoC 300 has a NoC height and a NoC width and includes unrouteable area 301 located within a central portion of NoC 300. Ten devices are dispersed throughout NoC 300, none of which are located within unrouteable area 301. Each device includes at least one bridge port. For ease of illustration, each device has a single bridge port. Device 310 includes bridge port 310a, device 311 includes bridge port 311a, device 312 includes bridge port 312a, device 313 includes bridge port 313a, device 314 includes bridge port 314a, device 315 includes bridge port 315a, device 316 includes bridge port 316a, device 317 includes bridge port 317a, device 318 includes bridge port 318a, and device 319 includes bridge port 319a. Generally, the location of each bridge port is limited by the location of the associated device and the footprint of the device within the NoC, i.e., the device width and height. For example, for an 8 cell×8 cell NoC, a device located at cell number 9 having a width of 1 cell and a height of 3 cells supports one or more bridge ports located at cell numbers 9, 17 and/or 25.

Ten sets of traffic flows between the devices are depicted; each traffic flow set includes at least one traffic flow. For example, a traffic flow set may include a traffic flow that defines a read request and a traffic flow that defines a write request. Traffic flow set 320 flows between bridge port 310a and bridge port 311a. Traffic flow set 321 flows between bridge port 310a and bridge port 312a. Traffic flow set 322 flows between bridge port 311a and bridge port 314a. Traffic flow set 323 flows between bridge port 311a and bridge port 315a. Traffic flow set 324 flows between bridge port 312a and bridge port 314a. Traffic flow set 325 flows between bridge port 312a and bridge port 313a. Traffic flow set 326 flows between bridge port 314a and bridge port 316a. Traffic flow set 327 flows between bridge port 315a and bridge port 319a. Traffic flow set 328 flows between bridge port 315a and bridge port 317a. Traffic flow set 329 flows between bridge port 318a and bridge port 319a.

Referring back to FIG. 2, at 220, a VC is assigned to each traffic flow. Generally, VCs are assigned to reduce conflicts and simplify the subsequent topology generation. In one embodiment, the VCs are assigned using an iterative estimation process that performs a specify-evaluate-refine loop until no significant improvement in the estimations are generated. Other assignment methodologies are also contemplated.

At 230, a topology for the NoC is determined.

In one embodiment, a Head-of-Line (HoL) conflict graph (HCG) is constructed based on the traffic data and the VC assignments. The HCG includes traffic nodes and HoL edges. Each traffic node represents a traffic flow and each HoL edge represents an HoL conflict. An HoL conflict is defined as two traffic flows that are assigned to the same VC but have different traffic classes, such as, for example, different QoS values and/or different LS values. In one example, each traffic flow set has a single traffic flow, which results in ten traffic nodes. A color is then assigned to each traffic node to minimize HoL conflicts, with adjacent traffic nodes receiving different colors. In certain embodiments, minimum vertex coloring is used to find the minimum number of colors to assign to traffic nodes. In this example, the HCG includes eight traffic nodes in a first color (white), and two traffic nodes in a second color (grey).

A traffic graph (TG) for each color is constructed, and a candidate topology for each color is generated based on the respective TG. In one embodiment, the traffic graphs are constructed for all of the colors, and then candidate topologies are generated for all of the colors. In another embodiment, the TG is constructed for the first color, and then the candidate topology is generated for the first color. Next, the TG is constructed for the second color, and then the candidate topology is generated for the second color, and so on.

The TG for each color is constructed based on the physical data, the bridge data, the traffic data and the HCG. The TG includes ten nodes and ten edges. Each node is associated with a different bridge port, and each edge connects pairs of nodes and is associated with a set of traffic flows between two bridge ports. As discussed above, each set of traffic flows includes at least one traffic flow.

The candidate topology for each color is generated based on the respective TG. The candidate topology includes bridge ports, routers and connections.

First, a grid is generated based on the TG. The grid includes nodes and intersections that are formed by grid lines passing through each node. Each node is associated with a different bridge port and is located at a different intersection. In one embodiment, the grid is a Hanan grid formed by orthogonal vertical and horizontal grid lines. Other types of grids may also be generated, such as, for example, a lattice, a square or unit distance grid, etc.

Routers are then added to the grid. Each router is located at an intersection not occupied by a node.

Adjacent nodes and routers are then connected to create an initial mesh or topology.

A weight is then calculated for each connection, based on the traffic data, to create a weighted mesh or topology. In one embodiment, a traffic criticality index (TCI) is calculated for each traffic flow, and the TCI for each traffic flow is then added to a heating index for each connection that falls within a rectilinear bounding box for that traffic flow. The TCI may be based on traffic criticality and rate. The rectilinear bounding box for a particular traffic flow is defined by the source node (source bridge port) and the destination node (destination bridge port) of that traffic flow. In one embodiment, the weight for each connection is inversely proportional to the heating index for that connection, while in another embodiment, the weight is proportional to the heating index. The weights are then applied to the initial mesh or topology to create the weighted mesh or topology.

A degree-constrained minimum-cost mesh or topology is then determined based on the weighted mesh or topology, including removing one or more connections and one or more routers. In one embodiment, a degree-constrained minimum-cost Steiner tree is determined, which generates a plurality of trees, based on the degree and the number of nodes, and then the lowest cost tree is selected. The connections and routers through which traffic does not flow are then removed from the degree-constrained minimum-cost mesh or topology.

The candidate topology is then generated from the degree-constrained minimum-cost tree.

The candidate topologies are then merged to create a merged candidate topology, and the routers are merged within the merged candidate topology to generate the final topology. Generally, router merging reduces the number of routers in the topology by merging or combining two or more routers into a single router. Merged routers may also be relocated, i.e., placed at a location that does not correspond to any of the grid locations of the original routers. Router relocation may occur after the candidate topologies for each color have been merged, and/or during a later optimization process.

At 240, a route for each traffic flow is determined. In one embodiment, shortest path routing is used, with optional constraints to disallow cycles in the generated topology. Different routing methodologies may be employed, such as, for example, XY-YX routing, turn prohibition routing, etc.

At 250, a configuration/debug network is generated. The configuration/debug network includes the bridge ports, the routers, the connections and the routes. In one embodiment, the configuration/debug network mimics the data-network. Additionally, the configuration/debug network may be independently optimized in a manner similar to the data-network. The latency and performance of the configuration/debug network are typically relaxed in order to produce the simplest design with the lowest area.

At 260, a PCDC buffer is added to a connection between a bridge or router in a synchronous clock domain and an adjacent bridge or router in an asynchronous clock domain.

At 270, a link size is determined for each router in each route.

Generally, an SLB model is used to predict the link size for each router in the configuration/debug network (NoC configuration). The SLB model includes a route-based schema (i.e., features) that encapsulate the local and global information required to predict the link size for each router in each route (i.e., labels). The SLB model is trained by identifying and learning patterns from a minimal set of reference NoC configurations. To eliminate aliasing among routers, a router characteristic index (RCI) is calculated for each router based on the route-based schema. The RCI consistently maps a router to an index based on the router's traffic profile.

For training, both the route-based schema and the router link sizes are extracted from the set of reference NoC configurations, the RCI for each router is calculated, and then the route-based schema, the router RCIs and the router link sizes are provided to the SLB model in the form of reference route feature vectors and associated reference route label vectors. The SLB model is trained using the reference route feature vectors and the associated reference route label vectors. For prediction, only the route-based schema are extracted from the NoC configuration, the RCI for each router is calculated, and then the route-based schema and the router RCIs are provided to the trained SLB model as route feature vectors. The trained SLB model then predicts the route label vectors, i.e., the link size for each router in each route, based on the route feature vectors.

In one embodiment, the SLB model is an artificial neural network (ANN), such as, for example, a multi-layer perceptron (MLP) regressor model. In another embodiment, the SLB model is a tree-based supervised learning model, such as, for example, a decision tree regressor model, an extra tree regressor model, etc. In these embodiments, the SLB model may be trained using multi-fold cross validation and grid search-based hyper-parameter tuning. Other supervised learning-based models and training methods are also contemplated.

Figure 4:
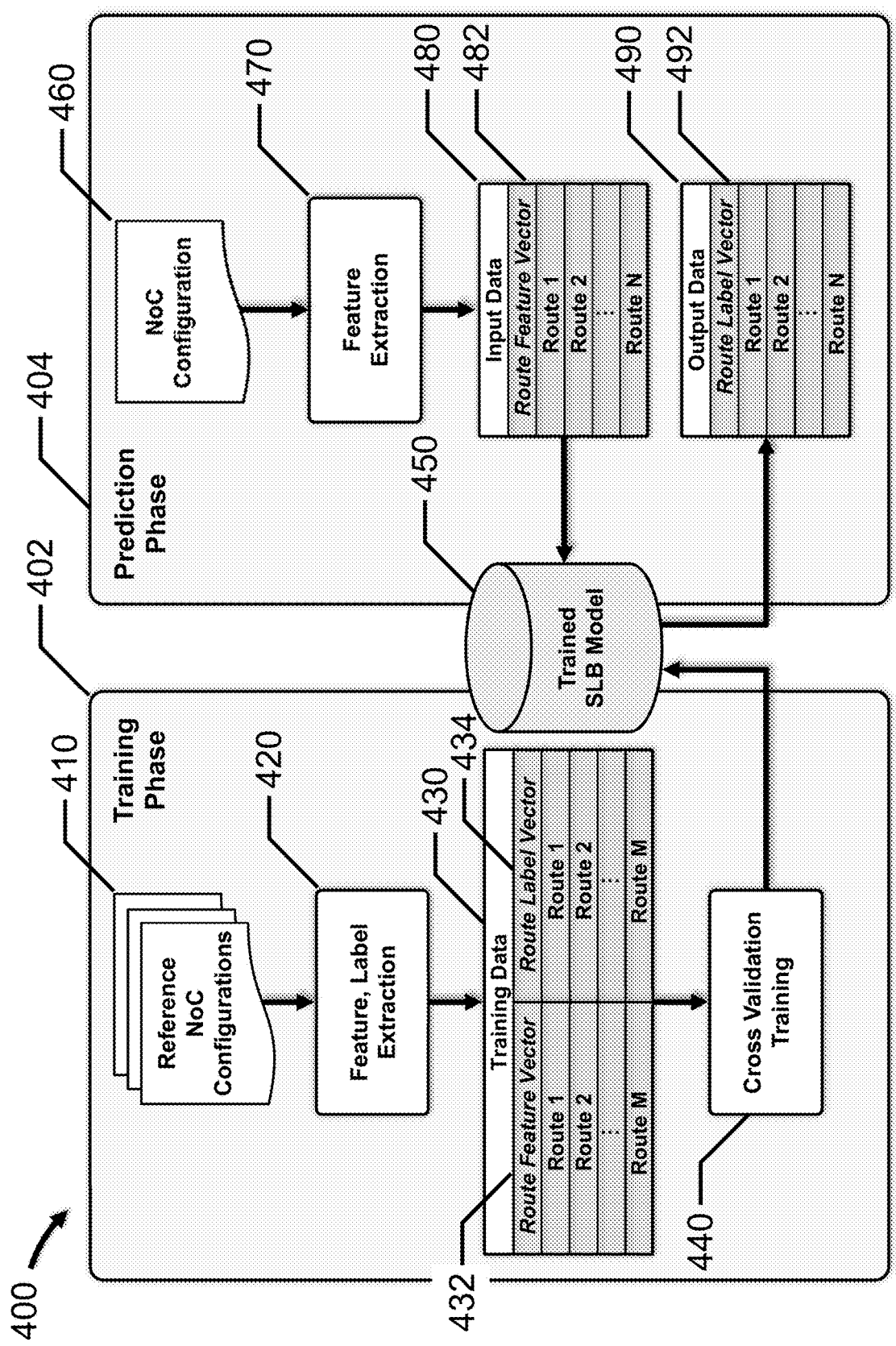
FIG. 4 depicts a flow diagram illustrating a training phase and a prediction phase for a supervised learning-based (SLB) model, in accordance with an embodiment of the present disclosure.

FIG. 4 depicts a flow diagram 400 illustrating training phase 402 and prediction phase 404 for SLB model 450, in accordance with an embodiment of the present disclosure. As noted above, SLB model 450 may be included within NoC synthesis module 134; alternatively, SLB model 450 may be provided as a software module 136.

With respect to training phase 401, at 410, the minimal set of reference NoC configurations is determined. Generally, five or less reference NoC network configurations may be selected to train SLB model 450. More particularly, four or five reference NoC configurations may be advantageously selected. In other embodiments, more than five reference NoC configurations may be selected to train SLB model 450. Each reference NoC configuration includes the bridge ports, routers, connections and routes for that NoC.

At 420, the route-based schema and the router link sizes for each route are extracted from the reference NoC configurations, the router RCIs are calculated, and the route-based schema, the router RCIs and the router link sizes are provided to SLB model 450 in the form of training data 430, i.e., reference route feature vectors 432 and associated reference route label vectors 434. In another embodiment, the router RCIs may be calculated apriori and stored with the route-based schema for each route within the reference NoC configurations.

Figure 5:
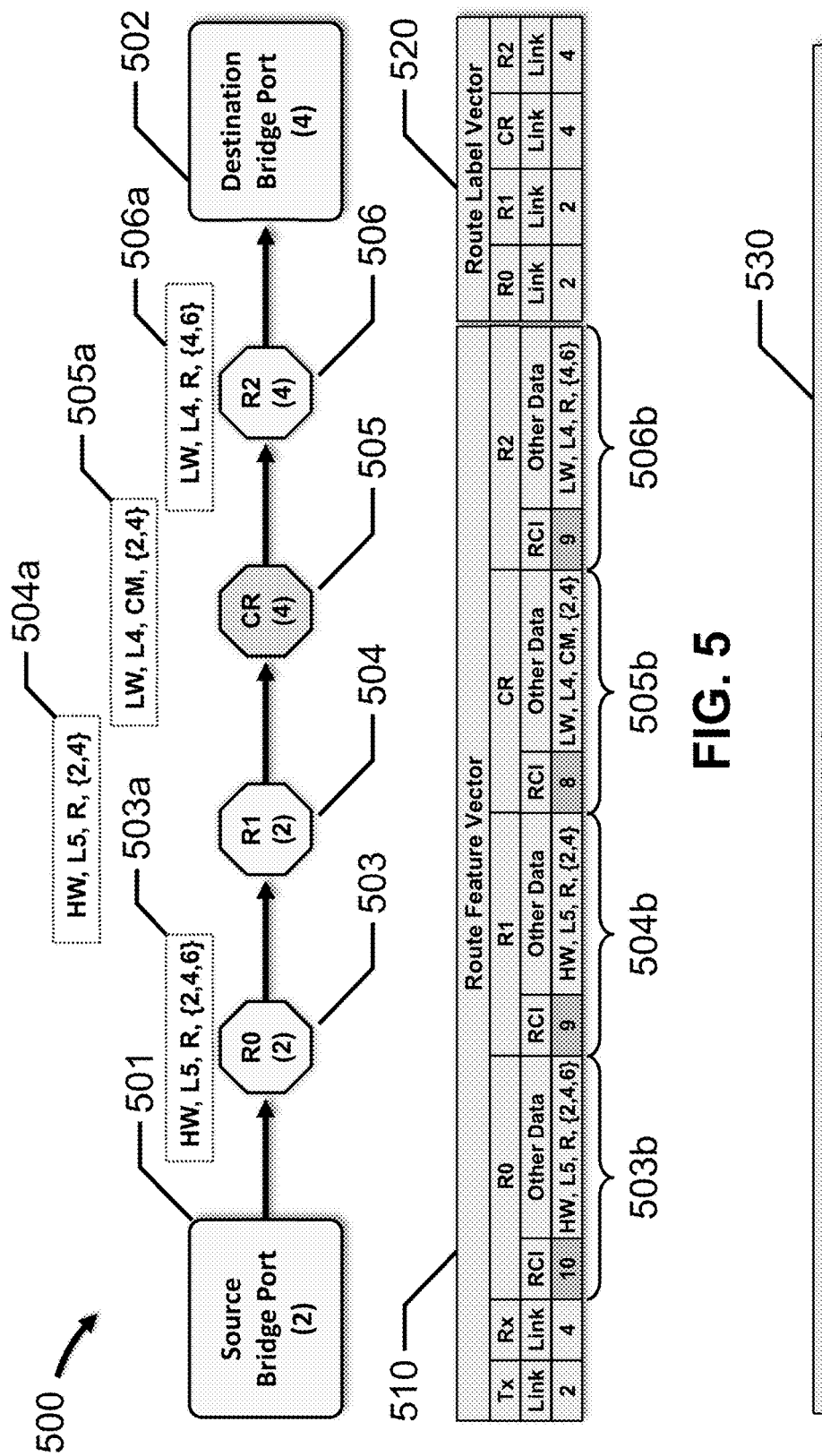
FIG. 5 depicts a block diagram of a route, an associated route feature vector, and an associated route label vector, in accordance with an embodiment of the present disclosure.

FIG. 5 depicts a block diagram of a route 500, associated route feature vector 510, and associated route label vector 520, in accordance with an embodiment of the present disclosure.

Route 500 includes source bridge port 501, destination bridge port 502, and routers 503 to 506. Traffic flows from source bridge port 501 to destination bridge port 502 through routers 503 to 506. Router 503 is the first router in route 500, is labeled "R0," and has a link size of 2. Router 504 is the second router in route 500, is labeled "R1," and has a link size of 2. Router 505 is the third router in route 500, is labeled "CR," and has a link size of 4. Router 506 is the fourth router in route 500, is labeled "R3," and has a link size of 4.

In one embodiment, the route-based schema for each route include link sizes for the source and destination bridge ports, and, for each router in the route, a wire mode, a communication layer, an element type, and a valid link size set. For example, the wire mode may be high wire (HW) or low wire (LW). The communication layer may be a read request (L0), a read/write request (L1), a write request (L2), a read response (L3), a read/write response (L4) or a write response (L5). The element type may be a router (R), a conversion router multiplexer (CM) or a conversion router demultiplexer (CD). The valid link size set may include one or more available link sizes for the router, such as, for example, {2,4,6}.

For illustration purposes, the data for each router are depicted directly above the router in FIG. 5. For route 500, source bridge port 501 has a link size of 2 and destination bridge port 502 has a link size of 4. Router data 503a includes an HW wire mode, an L5 communication layer, an R element type and a {2,4,6} link size set. Router data 504a includes an HW wire mode, an L5 communication layer, an R element type and a {2,4} link size set. Router data 505a includes an LW wire mode, an L4 communication layer, a CM element type and a {2,4} link size set. Router data 506a includes an LW wire mode, an L4 communication layer, an R element type and a {4,6} link size set.

Route feature vector 510 includes a source bridge port (Tx) link size of 2, a destination bridge port (Rx) link size of 4, router data sets for routers R0, R1, CM and R2. Router data set 503b includes an RCI of 10, an HW wire mode, an L5 communication layer, an R element type and a {2,4,6} link size set. Router data set 504b includes an RCI of 9, an HW wire mode, an L5 communication layer, an R element type and a {2,4} link size set. Router data set 505b includes an RCI of 8, an LW wire mode, an L4 communication layer, a CM element type and a {2,4} link size set. Router data set 506b includes an RCI of 9, an LW wire mode, an L4 communication layer, an R element type and a {4,6} link size set.

Route label vector 520 includes an R0 link size of 2, an R1 link size of 2, a CR link size of 4, an R2 link size of 4.

In one embodiment, the RCI for each router is calculated by aggregating traffic data through the router, and then generating and scaling a k·(m+n) bit sequence.

More particularly, traffic data is aggregated through the router across k QoS-LS buckets. The traffic data includes a plurality of traffic flows, and each traffic flow includes a source bridge port, a destination bridge port and a traffic class, each traffic class including a peak data rate, an average data rate, a quality of service (QoS) level and a latency (LS) level.

For each QoS-LS bucket, a total traffic rate for the router, scaled to m bits, is determined, and a utilization for the router, scaled to n bits, is determined. The utilization is a percentage of the total traffic across all of the routers. The k·(m+n) bit sequence is generated based on the total traffic rate and the utilization for each QoS-LS bucket, and then scaled to generate the RCI for the router.

Figure 6:
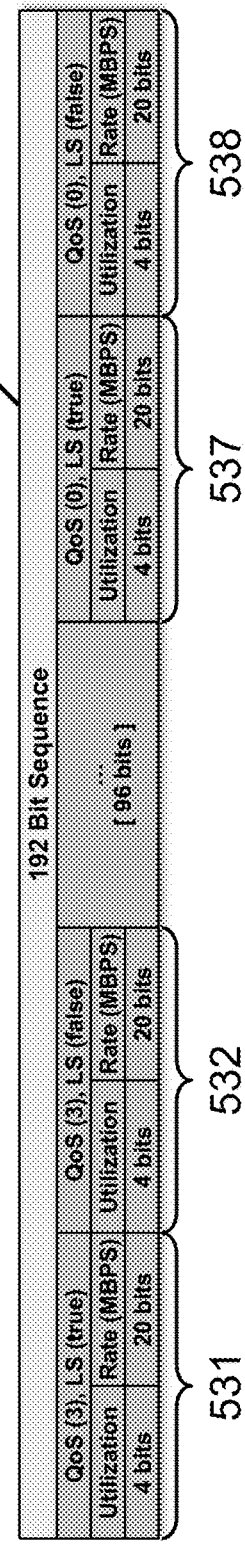
FIG. 6 depicts a bit sequence for an RCI, in accordance with an embodiment of the present disclosure.

FIG. 6 depicts a bit sequence 530 for an RCI, in accordance with an embodiment of the present disclosure.

In this example, k is 8, each traffic class includes one of four QoS levels and one of two LS levels, each QoS-LS bucket has a different combination of QoS level and LS level, m is 4, n is 20, and the k·(m+n) bit sequence is 192 bits. Subsequence 531 includes the utilization and traffic rate for the QoS-LS bucket having a QoS of 3 and an LS of true, subsequence 532 includes the utilization and traffic rate for the QoS-LS bucket having a QoS of 3 and an LS of false, subsequence 537 includes the utilization and traffic rate for the QoS-LS bucket having a QoS of 0 and an LS of true, and subsequence 538 includes the utilization and traffic rate for the QoS-LS bucket having a QoS of 0 and an LS of false. The four subsequences associated with QoS-LS buckets having combinations of a QoS of 2 and 1, and an LS of true and false, are not shown for clarity.

Referring back to FIG. 4, at 440, SLB model 450 is trained using a cross training validation process.

Figure 7:
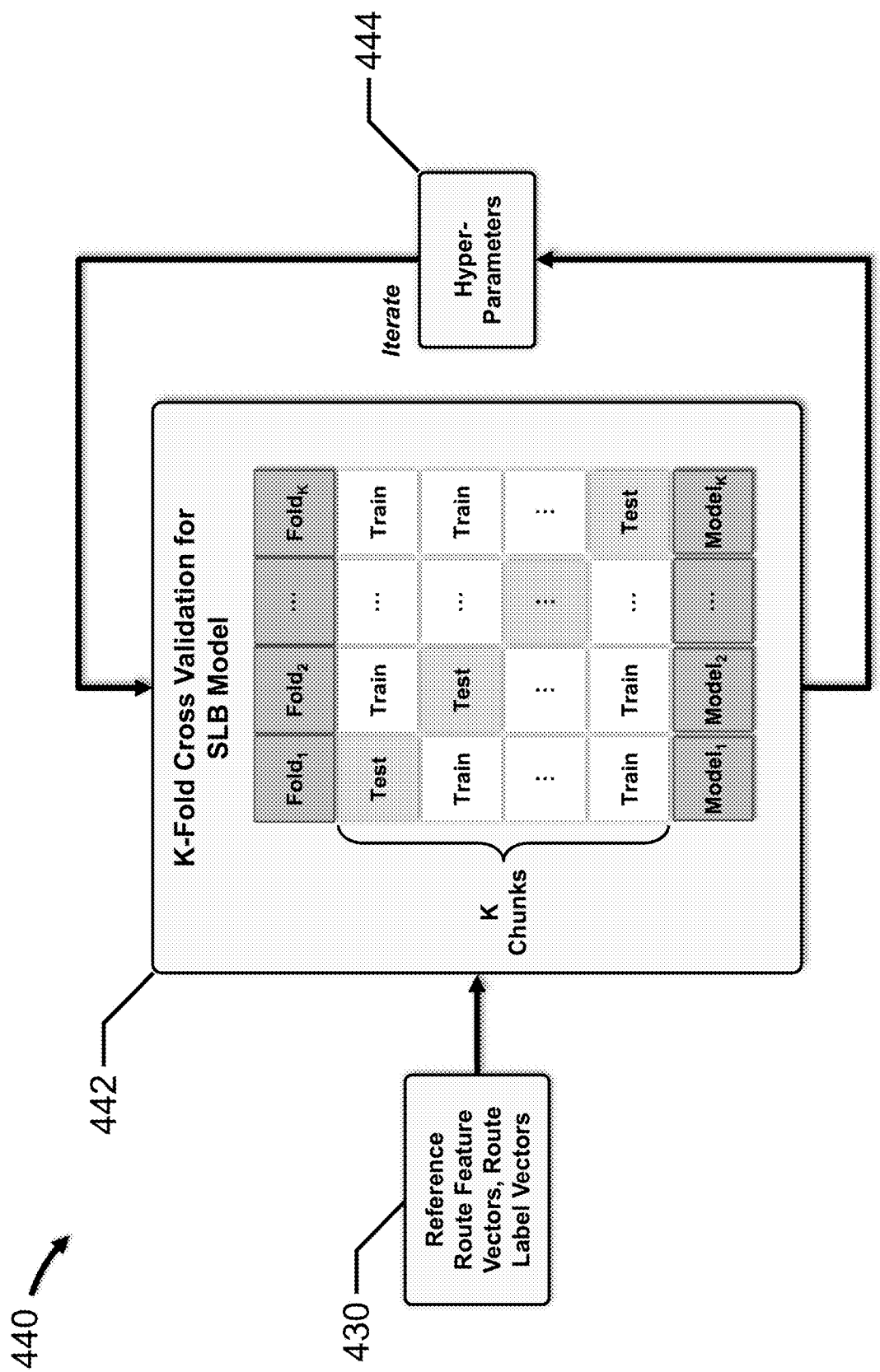
FIG. 7 illustrates a cross training validation process for an SLB model, in accordance with an embodiment of the present disclosure.

FIG. 7 illustrates a cross training validation process for SLB model 450, in accordance with an embodiment of the present disclosure. At 442, iterative K-fold cross validation process 442 is performed based on training data 430 and hyper-parameters or weights 444. In one embodiment, Grid-SearchCV-based hyper-parameter tuning identifies the optimal values for hidden layers, learning rates, optimizer functions, etc. The best model produced by K-fold cross validation process 442 is selected as the model to be used for prediction phase 404.

More particularly, in one embodiment, training data 430 is randomly partitioned into K equal-sized chunks. A single chunk is identified as validation data for testing SLB model 450 ("Test"), and the remaining K-1 chunks are identified as training data for training SLB model 450 ("Train"). A row in the K-1 chunks is provided to SLB model 450, along with the corresponding route label vector. The output of SLB model 450 is compared to the route label vector to generate the resultant error. The weights of SLB model 450 are then adjusted to minimize the error. This process is repeated for all of the rows in the K-1 chunks of training data until the error is within an acceptable rate, range, number, etc. The SLB model 450 is then tested using the chunk that is identified as validation data, and the error determined. The cross-validation process is repeated a total of K times or folds, with each of the K chunks used exactly once as validation data. A total of K versions of SLB model 450 are created. The version of SLB model 450 with the best validation performance is then selected as trained SLB model 450.

Referring back to FIG. 4 with respect to prediction phase 404, at 460, the NoC configuration is determined. As discussed above, the NoC configuration includes the bridge ports, routers, connections and routes for the NoC.

At 470, the route-based schema for each route are extracted from the NoC configuration, the router RCIs are calculated, and the route-based schema and the router RCIs are provided to trained SLB model 450 as input data 480 in the form of route feature vectors 482. In one embodiment, each route feature vector 482 corresponds to one row of input data 480. Other data formats are also contemplated.

Trained SLB model 450 processes input data 480 and generates output data 490 in the form of route label vectors 492 for the NoC configuration.

In one embodiment, each route feature vector 482 is provided to trained SLB model 450. Based on internal weights determined by the training process, trained SLB model 450 determines, and then outputs, a corresponding route label vector 492 for each route feature vector 482. For example, route label vector 492 identified as "Route 1" corresponds to route feature vector 482 identified as "Route 1," etc. Each route label vector 492 includes the predicted link sizes for each of the routers included within corresponding route feature vector 482. Because more than one route may pass though a particular router, that router may be included in more than one route feature vector 482, and, consequently, that router may be included in more than one route label vector 492. Accordingly, trained SLB model 450 may predict more than one link size for a router. When the predicted link sizes for a router are different, a statistical method, such as, for example, mean, mode, etc., may be used to determine the final link size for that router.

Referring back to FIG. 2, at 270, a resizer may also be added between a bridge and a router with different link sizes or between adjacent routers with different link sizes.

Routers may also be relocated within the NoC. For example, the physical location of the router in the NoC may be changed, the route position of the router in a route label vector(s) may be changed, etc.

At 280, pipeline and retiming components are added based on timing. In order to meeting timing, pipeline components are added at appropriate locations to keep the slack (i.e., the difference between a required time and an arrival time) within appropriate limits. For example, one or more components may be relocated, and, if the relocated components are not able to meet timing, then one or more pipeline components may be added. For example, component relocation may be based on force-directed placement, etc.

At 290, NoC output specification 292 is generated, and then stored in memory 130. Additionally, NoC output specification 292 may be transmitted over network 20, provided to software modules 136 used by the NoC designer, etc. For example, NoC output specification 292 may be provided as input to a NoC fabrication process in a chip foundry. Reports 294 may also be generated, and then stored in memory 130. For example, reports 294 may contain the components used in the design (e.g., routers, resizers, PCDCs, pipelines, etc.), the traffic on each link, the link utilization, latencies across a route, etc.

Figure 8:
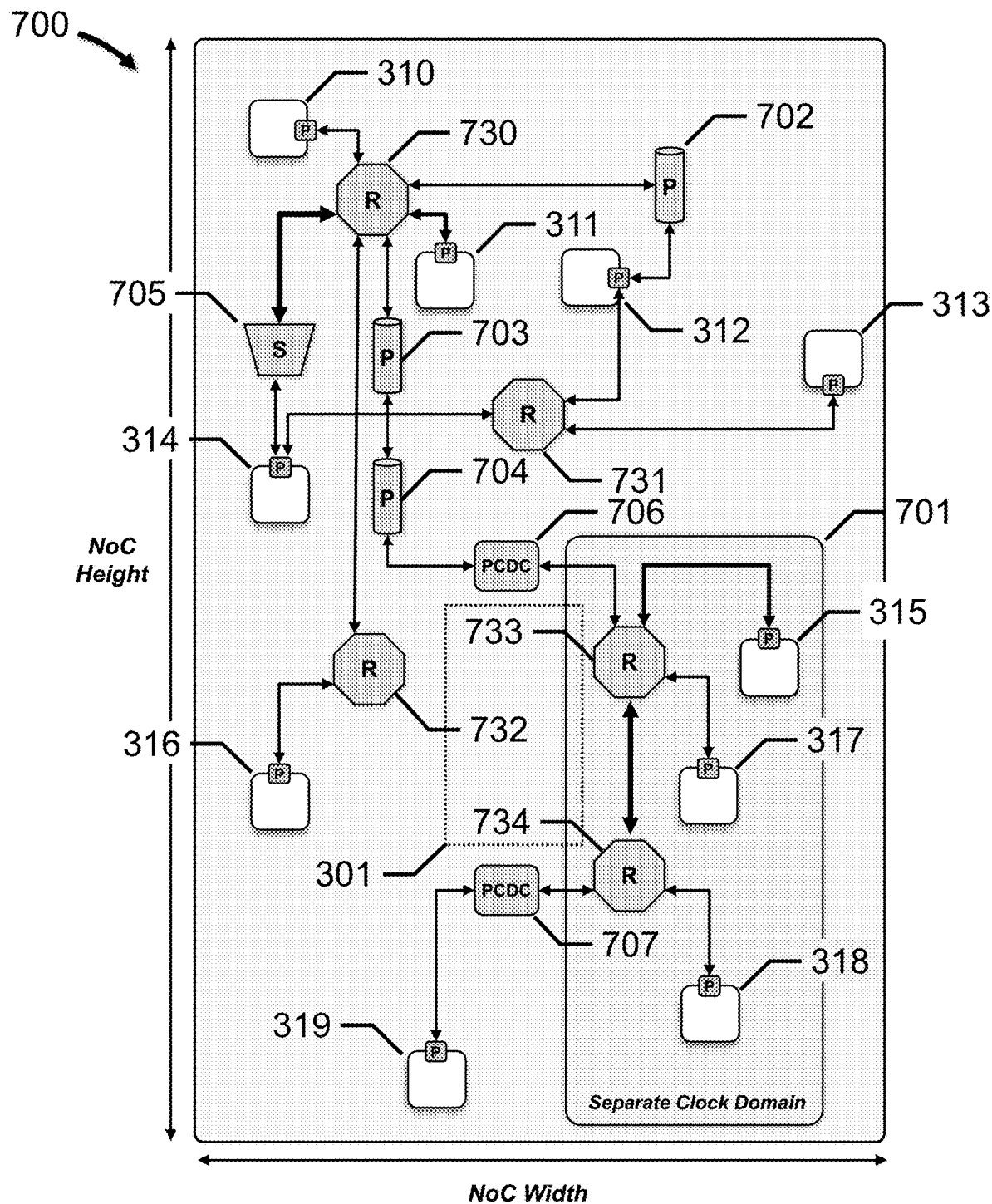
FIG. 8 depicts a graphical representation of an output specification for a NoC, in accordance with an embodiment of the present disclosure.

FIG. 8 depicts a graphical representation of NoC output specification 292, in accordance with an embodiment of the present disclosure. A user may view NoC 700 on display 152.

NoC 700 has the same NoC height and width as NoC 300, and includes unrouteable area 301 located within a central portion of NoC 700 and separate clock domain 701. Device 310 is connected to router 730. Device 311 is connected to router 730. Device 312 is connected to router 731 and to router 730 through pipeline 702. Device 313 is connected to router 731. Device 314 is connected to router 731 and to router 730 through resizer 705. Device 315 is connected to router 733. Device 316 is connected to router 732. Device 317 is connected to router 733. Device 318 is connected to router 734. Device 319 is connected to router 734 through PCDC buffer 707. Router 730 is connected to router 732 and to router 733 through pipelines 703, 704 and PCDC buffer 706. Router 733 is connected to router 734.

Figure 9A:
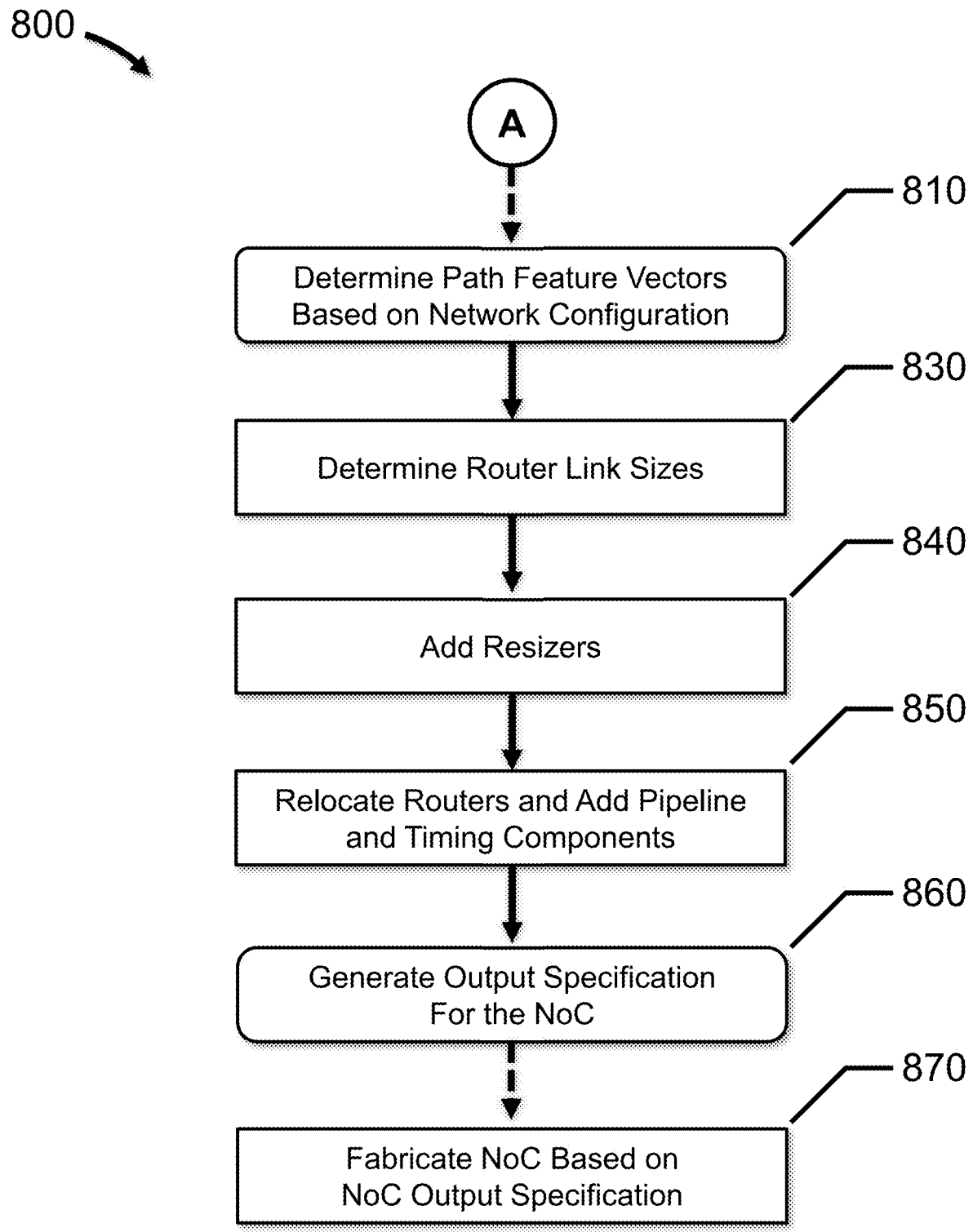
FIGS. 9A to 9C depict flow diagrams representing functionality associated with synthesizing a NoC, in accordance with an embodiment of the present disclosure.
Figure 9B:
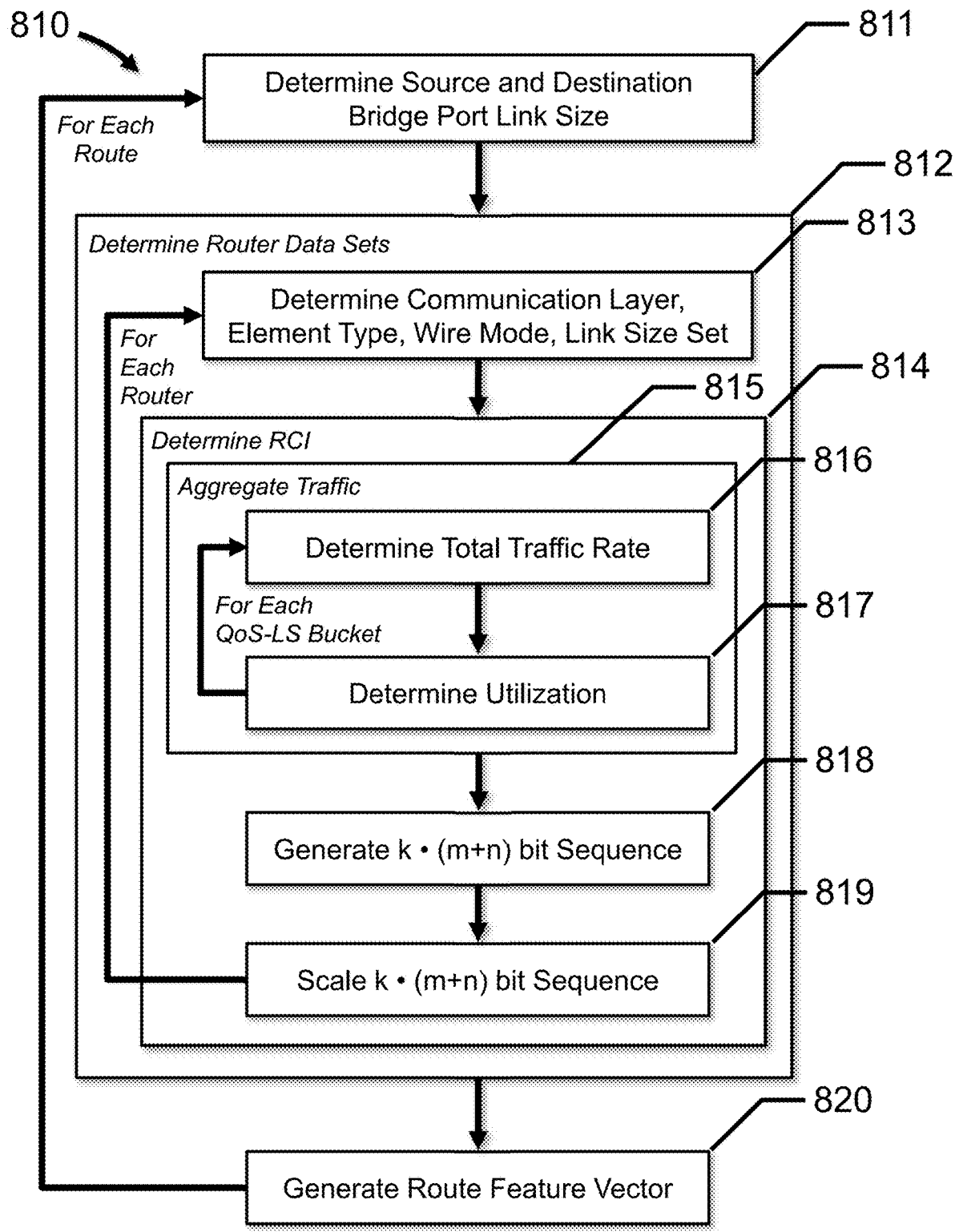
Figure 9C:
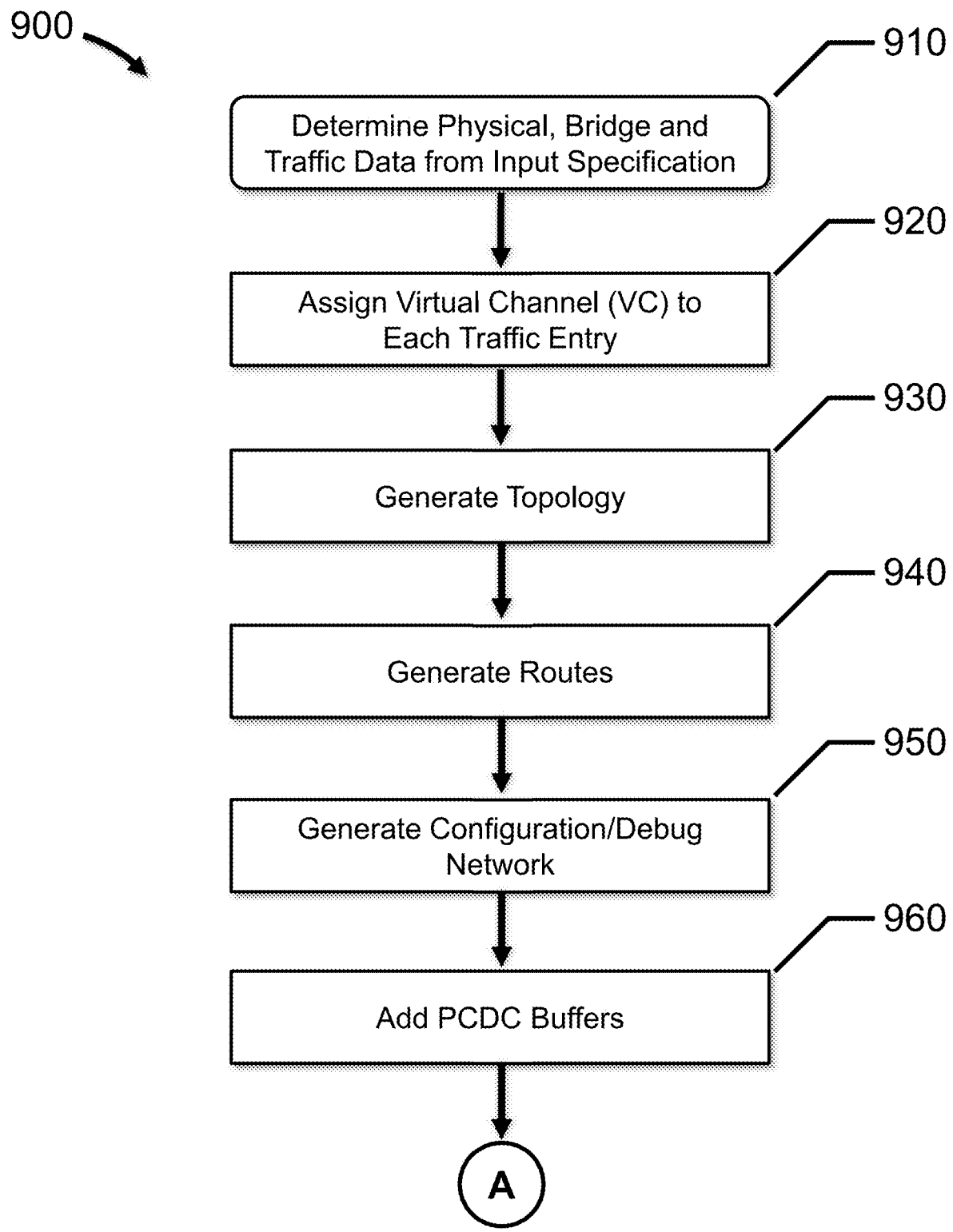

FIGS. 9A to 9C depict flow diagrams representing functionality associated with synthesizing a NoC, in accordance with embodiments of the present disclosure. FIG. 9A depicts flow diagram 800, FIG. 9B depicts flow diagram 810, and FIG. 9C depicts flow diagram 900.

At 810, a plurality of route feature vectors are determined based on a network configuration. The network configuration includes a plurality of bridge ports, a plurality of routers, a plurality of connections and a plurality of routes. Each route includes a source bridge port, a destination bridge port and one or more routers disposed along a connection route between the source bridge port and the destination bridge port. Each route feature vector is associated with a route and includes a source bridge link size, a destination bridge link size, and a router data set for each router in the route.

In one embodiment, the functionalities at 811 to 820 are performed for each route.

At 811, the source bridge port size and the destination bridge port size are determined for the route based on the network configuration.

At 812, the router data set for each router in the route is determined based on the network configuration. In one embodiment, the functionalities at 813 to 819 are performed for each router in the route.

At 813, a communication layer, an element type, a wire mode, and a valid link size set for the router are determined based on the network configuration.

At 814, the router characteristic index (RCI) for the router is determined based on the network configuration. In one embodiment, the functionalities at 815 to 819 are performed to determine the RCI for the router.

At 815, traffic data through the router are aggregated across k QoS-LS buckets. The traffic data include a plurality of traffic flows, and each traffic flow includes a source bridge port, a destination bridge port and a traffic class. Each traffic class includes a peak data rate, an average data rate, a quality of service (QoS) level and a latency (LS) level. In one embodiment, aggregating the traffic data includes performing the functionalities at 816 and 817 for each QoS-LS bucket.

At 816, a total traffic rate for the router is determined. The total traffic rate is scaled to m bits.

At 817, a utilization for the router is determined. The utilization is a percentage of the total traffic across all of the routers, and is scaled to n bits.

At 818, a k·(m+n) bit sequence is generated based on the total traffic rate and the utilization for each QoS-LS bucket.

At 819, the k·(m+n) bit sequence is scaled to generate the RCI for the router.

At 820, the route feature vector associated with the route is generated.

At 830, a link size is determined for each router. More particularly, the route feature vectors are provided to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors.

At 840, a resizer is added between a bridge and a router with different link sizes or between adjacent routers with different link sizes.

At 850, routers are relocated and pipeline and retiming components are added based on timing.

At 860, an output specification is generated for the NoC.

In a further embodiment, at 870, a NoC is fabricated based on NoC output specification 292.

At 910, physical data, device data, bridge data and traffic data are determined based on an input specification for the NoC. The bridge data include the bridge ports, and the traffic data include a plurality of traffic flows. Each traffic flow includes a source bridge port, a destination bridge port, a peak traffic rate, an average traffic rate, and a traffic class.

At 920, a VC is assigned to each traffic flow to create a plurality of VC assignments.

At 930, a topology for the NoC is generated. The topology includes the bridge ports, the routers and the connections.

At 940, the routes are generated based on the topology and the traffic data, including, for each traffic flow, generating a route from the source bridge port to the destination bridge port, each route including one or more routers disposed along a connection route between the source bridge port and the destination bridge port.

At 950, a configuration/debug network is generated. The configuration/debug network includes the bridge ports, the routers, the connections and the routes.

At 960, a PCDC buffer is added to a connection between a bridge or router in a synchronous clock domain and an adjacent bridge or router in an asynchronous clock domain.

Embodiments of the present disclosure advantageously provide a system, a non-transitory computer-readable medium and a computer-based method for synthesizing a Network-on-Chip (NoC). The embodiments described above and summarized below are combinable.

In one embodiment, the system includes a storage element to store an input specification; and a processor, coupled to the storage element, configured to determine a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route; determine a link size for each router, including provide the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors; add a resizer between a bridge and a router with different link sizes or between adjacent routers with different link sizes; add pipeline and retiming components based on timing; and generate an output specification for the NoC.

In one embodiment, the non-transitory computer-readable medium stores instructions that, when executed by a processor, cause the processor to synthesize a Network-on-Chip (NoC), the instructions including determining a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route; determining a link size for each router, including providing the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors; adding a resizer between a bridge and a router with different link sizes or between adjacent routers with different link sizes; adding pipeline and retiming components based on timing; and generating an output specification for the NoC.

In one embodiment, the computer-based method for synthesizing a Network-on-Chip (NoC) includes determining a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route; determining a link size for each router, including providing the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors; adding a resizer between a bridge and a router with different link sizes or between adjacent routers with different link sizes; adding pipeline and retiming components based on timing; and generating an output specification for the NoC.

In one embodiment, each router data set includes a wire mode, a communication layer, an element type, a valid link size set and a router characteristic index (RCI).

In one embodiment, the wire mode is one of high wire or low wire; the communication layer is one of a read request, a read/write request, a write request, a read response, a read/write response or a write response; the element type is one of a router, a conversion router multiplexer or a conversion router demultiplexer; and the valid link size set includes one or more available link sizes.

In one embodiment, the RCI for each router is unique and determined by aggregating traffic data through the router across k QoS-LS buckets, the traffic data including a plurality of traffic flows, each traffic flow including a source bridge port, a destination bridge port and a traffic class, each traffic class including a peak data rate, an average data rate, a quality of service (QoS) level and a latency (LS) level, said aggregating including, for each QoS-LS bucket determining a total traffic rate for the router scaled to m bits, and determining a utilization for the router scaled to n bits, the utilization being a percentage of the total traffic across all of the routers; generating a k·(m+n) bit sequence based on the total traffic rate and the utilization for each QoS-LS bucket; and scaling the k·(m+n) bit sequence to generate the RCI for the router.

In one embodiment, k is 8, each traffic class includes one of four QoS levels and one of two LS levels, and each QoS-LS bucket has a different combination of QoS level and LS level; and m is 4, n is 20 and each k·(m+n) bit sequence is logarithmically-scaled.

In one embodiment, the SLB model is an artificial neural network (ANN), and where the ANN is a multilayer perceptron regressor model that is trained using multi-fold cross validation and grid search-based hyper-parameter tuning.

In one embodiment, the reference route feature vectors and the reference route label vectors are determined based on five or less reference NoC configurations.

In one embodiment, relocating routers, including at least one of changing the route position of one or more routers in one or more route label vectors; or changing a physical position of one or more routers.

In one embodiment, synthesizing the NoC also includes determining physical data, device data, bridge data and traffic data based on an input specification for the NoC, the bridge data including the bridge ports, and the traffic data including a plurality of traffic flows, each traffic flow including a source bridge port, a destination bridge port, a peak traffic rate, an average traffic rate, and a traffic class, the source bridge port and the destination bridge port being included in the bridge data; assigning a virtual channel (VC) to each traffic entry; generating a topology for the NoC including the bridge ports, the routers and the connections; generating the routes based on the topology and the traffic data, including, for each traffic flow, generating a route from the source bridge port to the destination bridge port, each route including one or more routers disposed along a connection route between the source bridge port and the destination bridge port; generating a configuration/debug network including the bridge ports, the routers, the connections and the routes; adding a physical clock domain crossing (PCDC) buffer to a connection between a bridge or router in a synchronous clock domain and an adjacent bridge or router in an asynchronous clock domain; and generating the network configuration.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for synthesizing a Network-on-Chip (NoC), comprising:

determining a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route;

determining a link size for each router, including:
providing the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors;

adding a resizer between a bridge and a router with different link sizes or between adjacent routers with different link sizes;

adding pipeline and retiming components based on timing; and generating an output specification for the NoC.

2. The computer-based method according to claim 1, where each router data set includes a wire mode, a communication layer, an element type, a valid link size set and a router characteristic index (RCI).

3. The computer-based method according to claim 2, where:

the wire mode is one of high wire or low wire;
the communication layer is one of a read request, a read/write request, a write request, a read response, a read/write response or a write response;
the element type is one of a router, a conversion router multiplexer or a conversion router demultiplexer; and
the valid link size set includes one or more available link sizes.

4. The computer-based method according to claim 2, where the RCI for each router is unique and determined by:
aggregating traffic data through the router across a number of QoS-LS buckets, k, the traffic data including a plurality of traffic flows, each traffic flow including a source bridge port, a destination bridge port and a traffic class, each traffic class including a peak data rate, an average data rate, a quality of service (QoS) level and a latency (LS) level, said aggregating including, for each QoS-LS bucket:
determining a total traffic rate for the router scaled to a first number of bits, m, and
determining a utilization for the router scaled to a second number of bits, n, the utilization being a percentage of the total traffic across all of the routers;
generating a k·(m+n) bit sequence based on the total traffic rate and the utilization for each QoS-LS bucket; and
scaling the k·(m+n) bit sequence to generate the RCI for the router.

5. The computer-based method according to claim 4, where:
k is 8, each traffic class includes one of four QoS levels and one of two LS levels, and each QoS-LS bucket has a different combination of QoS level and LS level; and
m is 4, n is 20 and each k·(m+n) bit sequence is logarithmically-scaled.

6. The computer-based method according to claim 1, where the SLB model is an artificial neural network (ANN), and where the ANN is a multilayer perceptron regressor model that is trained using multi-fold cross validation and grid search-based hyper-parameter tuning.

7. The computer-based method according to claim 1, where the reference route feature vectors and the reference route label vectors are determined based on five or less reference NoC configurations.

8. The computer-based method according to claim 1, further comprising relocating routers, including at least one of:
changing the route position of one or more routers in one or more route label vectors; or
changing a physical position of one or more routers.

9. The computer-based method according to claim 1, further comprising:
determining physical data, device data, bridge data and traffic data based on an input specification for the NoC, the bridge data including the bridge ports, and the traffic data including a plurality of traffic flows, each traffic flow including a source bridge port, a destination bridge port, a peak traffic rate, an average traffic rate, and a traffic class, the source bridge port and the destination bridge port being included in the bridge data;
assigning a virtual channel (VC) to each traffic entry;
generating a topology for the NoC including the bridge ports, the routers and the connections;
generating the routes based on the topology and the traffic data, including, for each traffic flow, generating a route from the source bridge port to the destination bridge port, each route including one or more routers disposed along a connection route between the source bridge port and the destination bridge port;
generating a configuration/debug network including the bridge ports, the routers, the connections and the routes;
adding a physical clock domain crossing (PCDC) buffer to a connection between a bridge or router in a synchronous clock domain and an adjacent bridge or router in an asynchronous clock domain; and
generating the network configuration.

10. A system for synthesizing a Network-on-Chip (NoC), comprising:
a storage element that stores an input specification; and
a processor, coupled to the storage element, configured to:
determine a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route;
determine a link size for each router, including provide the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors;
add a resizer between a bridge and a router with different link sizes or between adjacent routers with different link sizes;
add pipeline and retiming components based on timing; and
generate an output specification for the NoC.

11. The system according to claim 10, where each router data set includes a wire mode, a communication layer, an element type, a valid link size set and a router characteristic index (RCI).

12. The system according to claim 11, where:
the wire mode is one of high wire or low wire;
the communication layer is one of a read request, a read/write request, a write request, a read response, a read/write response or a write response;
the element type is one of a router, a conversion router multiplexer or a conversion router demultiplexer; and
the valid link size set includes one or more available link sizes.

13. The system according to claim 11, where the RCI for each router is unique, and the processor is further configured to:
aggregate traffic data through the router across a number of QoS-LS buckets, k, the traffic data including a plurality of traffic flows, each traffic flow including a source bridge port, a destination bridge port and a traffic class, each traffic class including a peak data rate, an average data rate, a quality of service (QoS) level and a latency (LS) level, said aggregating including, for each QoS-LS bucket:
determine a total traffic rate for the router scaled to a first number of bits, m, and
determine a utilization for the router scaled to era second number of bits, n, the utilization being a percentage of the total traffic across all of the routers;
generate a k·(m+n) bit sequence based on the total traffic rate and the utilization for each QoS-LS bucket; and
scale the k·(m+n) bit sequence to generate the RCI for the router.

14. The system according to claim 13, where:
k is 8, each traffic class includes one of four QoS levels and one of two LS levels, and each QoS-LS bucket has a different combination of QoS level and LS level; and
m is 4, n is 20 and each k·(m+n) bit sequence is logarithmically-scaled.

15. The system according to claim 10, where the SLB model is an artificial neural network (ANN), and where the ANN is a multilayer perceptron regressor model that is trained using multi-fold cross validation and grid search-based hyper-parameter tuning.

16. The system according to claim 10, where the reference route feature vectors and the reference route label vectors are determined based on five or less reference NoC configurations.

17. The system according to claim 10, where the processor is further configured to relocate routers, including at least one of:
change the route position of one or more routers in one or more route label vectors; or
change a physical position of one or more routers.

18. The system according to claim 10, where the processor is further configured to:
determine physical data, device data, bridge data and traffic data based on an input specification for the NoC, the bridge data including the bridge ports, and the traffic data including a plurality of traffic flows, each traffic flow including a source bridge port, a destination bridge port, a peak traffic rate, an average traffic rate, and a traffic class, the source bridge port and the destination bridge port being included in the bridge data;
assign a virtual channel (VC) to each traffic entry;
generate a topology for the NoC including the bridge ports, the routers and the connections;
generate the routes based on the topology and the traffic data, including, for each traffic flow, generating a route from the source bridge port to the destination bridge port, each route including one or more routers disposed along a connection route between the source bridge port and the destination bridge port;
generate a configuration/debug network including the bridge ports, the routers, the connections and the routes;
add a physical clock domain crossing (PCDC) buffer to a connection between a bridge or router in a synchronous clock domain and an adjacent bridge or router in an asynchronous clock domain; and
generate the network configuration.

19. A non-transitory computer-readable medium storing instructions that, when executed by a processor, cause the processor to synthesize a Network-on-Chip (NoC), the instructions comprising:
determining a plurality of route feature vectors based on a network configuration for a NoC, the network configuration including a plurality of bridge ports, a plurality of routers, a plurality of connections and a plurality of routes, each route including a source bridge port, a destination bridge port and one or more routers disposed along a connection route between the source bridge port and the destination bridge port, where each route feature vector is associated with a route and includes a source bridge port link size, a destination bridge port link size, and a router data set for each router in the route;
determining a link size for each router, including:
providing the route feature vectors to a supervised learning-based (SLB) model to generate a plurality of route label vectors, where each route label vector is associated with a route feature vector and includes the link size and a route position for each router, and where the SLB model is trained based on a plurality of reference route feature vectors and a plurality of associated reference route label vectors;
adding a resizer between a bridge and a router with different link sizes or between adjacent routers with different link sizes;
adding pipeline and retiming components based on timing; and
generating an output specification for the NoC.

20. The non-transitory computer-readable medium according to claim 19, where each router data set includes a wire mode, a communication layer, an element type, a valid link size set and a router characteristic index (RCI), and where the RCI for each router is unique and determined by:
aggregating traffic data through the router across a number of QoS-LS buckets, k, the traffic data including a plurality of traffic flows, each traffic flow including a source bridge port, a destination bridge port and a traffic class, each traffic class including a peak data rate, an average data rate, a quality of service (QoS) level and a latency (LS) level, said aggregating including, for each QoS-LS bucket:
determining a total traffic rate for the router scaled to a first number of bits, m, and
determining a utilization for the router scaled to a second number of bits, n, the utilization being a percentage of the total traffic across all of the routers;
generating a k·(m+n) bit sequence based on the total traffic rate and the utilization for each QoS-LS bucket; and
scaling the k·(m+n) bit sequence to generate the RCI for the router.

* * * * *